Dec. 18, 1923.                                              1,478,256
                        J. O. REID
             APPARATUS FOR TILTING AUTOMOBILES
                   Filed Aug. 21, 1922          2 Sheets-Sheet 1

INVENTOR.
J. O. Reid.
BY J. Edward Maybee.
ATTY.

Dec. 18, 1923.
J. O. REID
1,478,256
APPARATUS FOR TILTING AUTOMOBILES
Filed Aug. 21, 1922   2 Sheets-Sheet 2
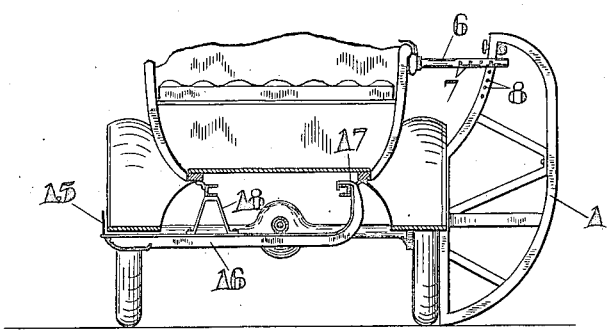
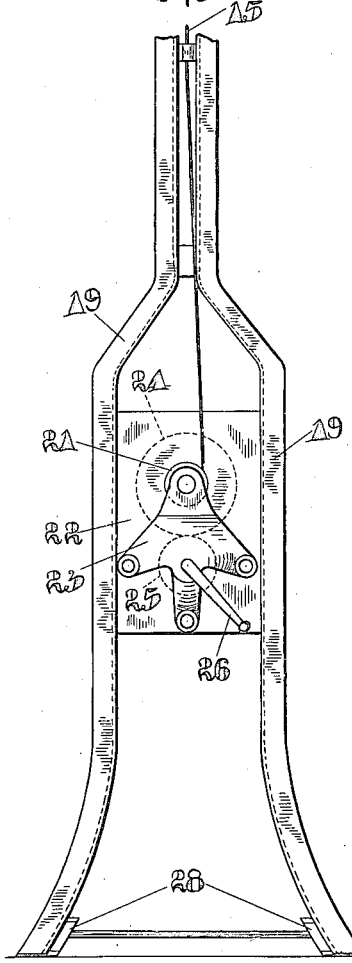
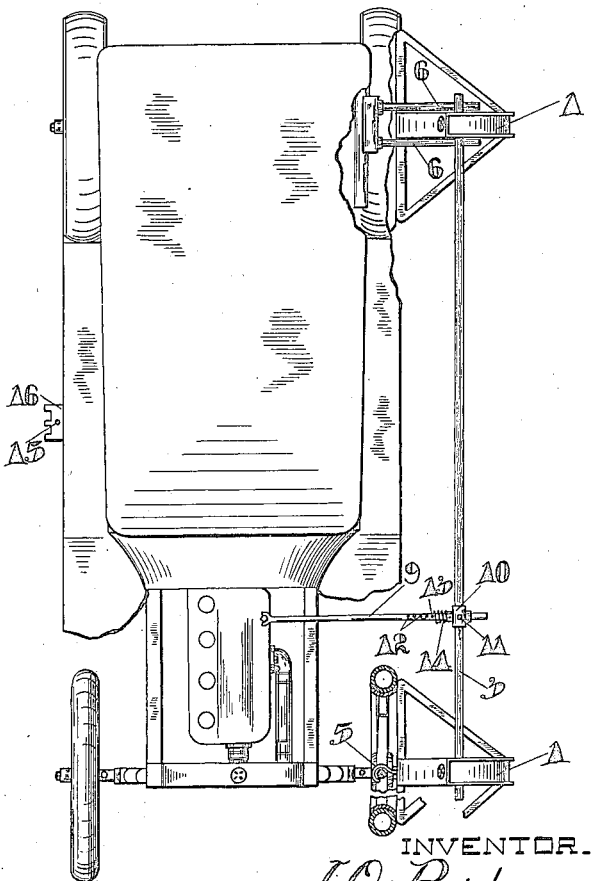
INVENTOR.
J. O. Reid.
BY J. Edward Maybee.
ATTY.

Patented Dec. 18, 1923.

1,478,256

UNITED STATES PATENT OFFICE.

JAMES OLVER REID, OF OSHAWA, ONTARIO, CANADA, ASSIGNOR TO JAMES McBAIN REID AND SAID JAMES OLVER REID, TRADING UNDER THE FIRM NAME OF J. M. & J. O. REID, OF OSHAWA, CANADA.

APPARATUS FOR TILTING AUTOMOBILES.

Application filed August 21, 1922. Serial No. 583,352.

*To all whom it may concern:*

Be it known that I, JAMES OLVER REID, of the town of Oshawa, in the county of Ontario, Province of Ontario, Canada, a subject of the King of Great Britain, have invented certain new and useful Improvements in Apparatus for Tilting Automobiles, of which the following is a specification.

This invention relates to means used for tilting automobiles in such a manner as to render the under side thereof readily accessible for repairs or painting, and the object of my invention is to provide improved means for this purpose which may be secured in position while the automobile is standing on the floor, which is adjustable to suit cars of various sizes, which may be quickly and securely placed in position for use, which is simple to manufacture and reasonable in cost, and which, when not in use, will take up very little space.

I attain my object by means of the constructions hereinafter described and illustrated in the accompanying drawings in which—

Figure 1:
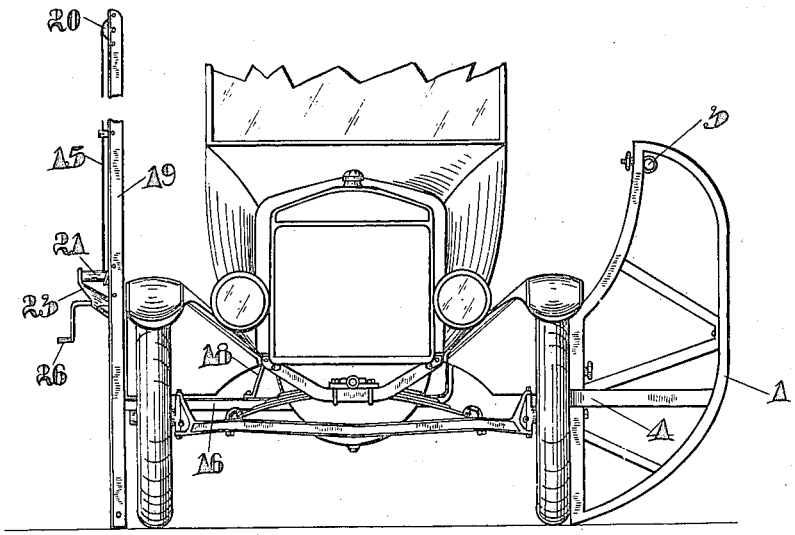
Figure 2:
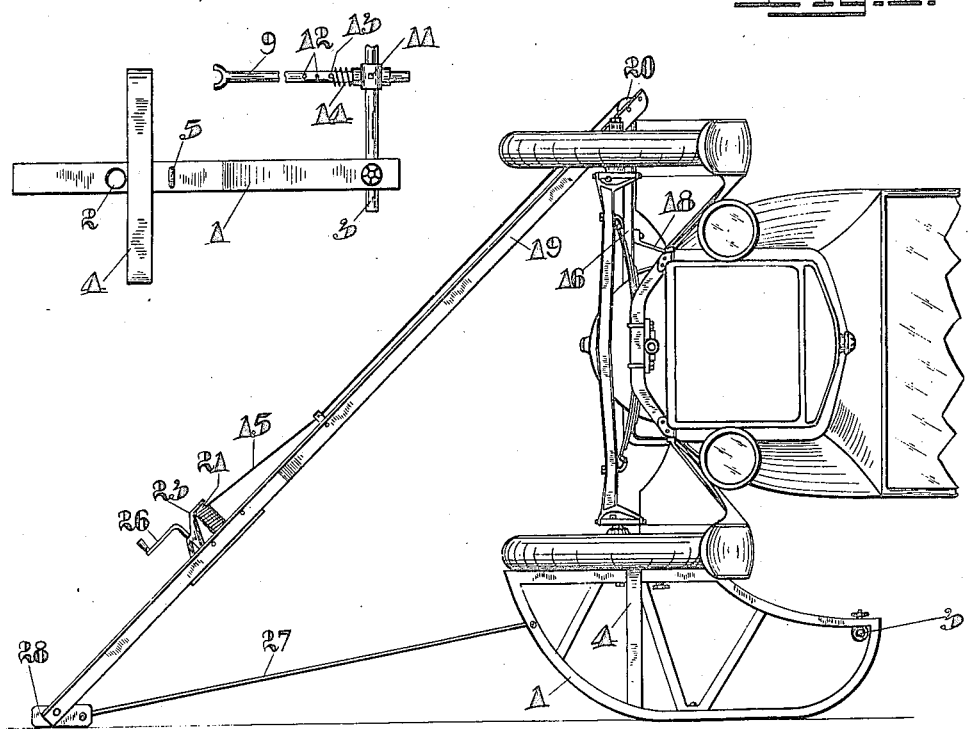

Fig. 1 is a front view of an automobile with my apparatus in position ready to commence the operation of tilting;

Fig. 2 a similar view showing the automobile in tilted position;

Fig. 3 an elevation of the derrick;

Fig. 4 a side view of the hook bar showing its method of engagement with the automobile; and Fig. 5 a plan view of an automobile showing the rocker supports and braces in position.

In the drawings like numerals of reference indicate corresponding parts in the different figures.

1 is a pair of rocker supports on which the automobile is adapted to be supported when being tilted. These rocker supports are stood on the floor with their points in alinement with the outside of the wheels and are provided with recesses 2 for receiving the hub caps. Referring particularly to Fig. 1, the upper ends of these rocker supports are connected by a tie bar 3. In order to accommodate different size cars, this tie bar is so connected with the rocker supports 1 that the rocker supports may be moved to and from one another as may be necessary. This may be done in any suitable manner, one method being as illustrated in the drawings in which the bar is passed through the eyes of eye bolts passing through holes in the supports 1, notches being formed in the supports to receive the bar when the nuts or hand wheels on the bolts are tightened up.

A cross bar 4 is secured to each support on which the rim of the wheel may rest, and a hook bolt 5 is engaged with one of the spokes to hold the support in position. To each support is adjustably connected a support 6, the support 6 being provided with a series of holes 7, and the rocker support with a series of holes 8 by means of which the desired adjustment may be obtained. A brace 9 is connected at one end with the tie bar 3, the other end of this brace being adapted to engage against any suitable part of the car, for example, part of the engine. The end of the brace is preferably formed with a socket to engage over the head of a bolt or a nut. The connection between the brace and tie bar is preferably adjustable longitudinally of the tie rod as well as longitudinally of the brace. A sleeve 10 is provided having holes formed therethrough at substantially right angles to one another. Through one of these holes passes the brace 9 and through the other the tie bar 3. The sleeve 10 is held in position on the tie bar as adjusted by means of a set screw 11. In the brace 9 is formed a series of holes 12, in any one of which a pin 13 is placed to limit the movement of the brace relative to the sleeve. Preferably, however, a coil spring 14 is placed on the brace between the pin and the sleeve, which spring tends to hold the end of the brace against the part with which it is engaged.

For the purpose of tilting the car, I provide the derrick hereinafter described. The free end of the cable 15 of the derrick is connected to one end of a tilting bar 16. The other end of this tilting bar is provided with a hook 17 adapted to engage one of the channel members of the chassis frame or other suitable stationary part. On the upper side of this tilting bar is secured a bracket 18 which is adapted to engage the channel member at the other side of the chassis. This tilting bar is given the particular shape shown in order that the main portion of the same will be low enough not to interfere with the parts of the automobile which extend below the chassis frame.

The derrick comprises in the main two angle bar members 19, which are secured together with a slight space between them for the upper portion of their length. The lower portions of these members 19 are also secured together but are spaced further apart so that the derrick will not fall sideways. At the lower end of each member 19 is pivoted a shoe 28. Between the members 19 at their upper ends is journalled the grooved pulley 20, over which passes the cable 15. The end of the cable is wound on a drum 21 supported by a plate 22 and a bracket 23 secured to the members 19. This drum is rotated by a gear 24, which is driven by a gear 25 secured to the crank 26.

The end of the tilting bar 16, is formed with a projection at each side adapted to engage the sides of the members 19.

The apparatus is used as follows. The rocker supports 1 are placed in position with the hub caps extending into the recess 2 and the hook bolt engaging one of the spokes of the wheel. The tie bar 3, is, of course, properly secured and the braces 6 and 9 directed against the engine or other convenient part as hereinbefore referred to.

The tilting bar 16 is then engaged with the chassis frame and the derrick brought into position for use. The crank 26 is then operated to wind the cable 15 on the drum 21 and the end of the tilting bar is thus raised, its end engaging the members 19 and travelling up them as on a track. The automobile is thus tilted and rests on the rocker supports 1. When the necessary repair has been effected, the cable is unwound from the drum and the automobile allowed to turn back to proper position. To maintain the derrick in effective working position and prevent its slipping, the shoes 28 on the lower end of the derrick are connected with the rocker supports 1 by means of rods 27. These rods are secured in place after the rocker supports have been positioned at the sides of the wheels and after the derrick is placed in position for use, but before the tilting operation has been begun. These rods will be suitably shaped so that they will clear the wheels when the car is standing on the ground. The rockers, of course, change their position as the car is tilted and simultaneously the lower end of the derrick is moved forwardly or rearwardly by means of these rods. In order to make the rocker supports 1 suitable for tilting cars with various sized wheels, they may be provided with sliding blocks, and recesses 2 will then be formed in these blocks.

From the above description it will be seen that I have devised apparatus which will satisfactorily attain the objects of my invention as set out in the preamble of this specification.

What I claim as my invention is:—

1. In apparatus for tilting automobiles, the combination of a pair of spaced rocker supports adapted to be secured to one side of an automobile while the latter is standing on a plane surface and directed outwardly from the side thereof, and on to which the automobile is adapted to be tilted on its side, said rocker supports when in position being located substantially entirely above said plane surface.

2. In apparatus for tilting automobiles, the combination of a pair of spaced rocker supports adapted to be secured to the side of an automobile and directed transversely thereof with their lower points substantially touching the ground in the plane of the outside of the wheels, and on which the automobile is adapted to be tilted on its side.

3. In apparatus for tilting automobiles, the combination of a pair of spaced rocker supports adapted to be secured to the side of an automobile and directed transversely thereof, each of said rocker supports having a recess formed therein adapted to receive a hub cap and each having a hook member secured thereto adapted to engage a spoke of a wheel, and on which the automobile is adapted to be tilted on its side.

4. In apparatus for tilting automobiles, the combination of a pair of spaced rocker supports adapted to be secured to one side of an automobile while the latter is standing on a plane surface and directed outwardly from the side thereof, and on to which the automobile is adapted to be tilted on its side, said rocker supports when in position being located substantially entirely above said plane surface, and a tie bar connecting said rocker supports.

5. In apparatus for tilting automobiles, the combination of a pair of spaced rocker supports adapted to be secured to one side of an automobile while the latter is standing on a plane surface and directed outwardly from the side thereof, on to which the automobile is adapted to be tilted on its side, said rocker supports when in position being located substantially entirely above said plane surface, and a tie bar connecting said rocker supports, the connection between said tie bar and one of said rocker supports being adjustable.

6. In apparatus for tilting automobiles, the combination of a pair of spaced rocker supports adapted to be secured to one side of an automobile while the latter is standing on a plane surface and directed outwardly from the side thereof, on to which the automobile is adapted to be tilted on its side, said rocker supports when in position being located substantially entirely above said plane surface, a tie bar connecting said rocker supports and a brace connected at one end with said tie bar and adapted at its other end to be engaged with part of the automobile.

7. In apparatus for tilting automobiles, the combination of a pair of spaced rocker supports adapted to be secured to one side of an automobile while the latter is standing on a plane surface and directed outwardly from the side thereof, on to which the automobile is adapted to be tilted on its side, said rocker supports when in position being located substantially entirely above said plane surface, a tie bar connecting said rocker supports and a brace connected at one end with said tie bar and adapted at its other end to be engaged with part of the automobile, the connection between the brace and tie bar being adjustable longitudinally of the tie bar.

8. In apparatus for tilting automobiles, the combination of a pair of spaced rocker supports adapted to be secured to one side of an automobile while the latter is standing on a plane surface and directed outwardly from the side thereof, on to which the automobile is adapted to be tilted on its side, said rocker supports when in position being located substantially entirely above said plane surface, a tie bar connecting said rocker supports and a brace connected at one end with said tie bar and adapted at its other end to be engaged with part of the automobile, the connection between the brace and tie bar being adjustable longitudinally of the brace.

9. In apparatus for tilting automobiles, the combination of a pair of spaced rocker supports adapted to be secured to one side of an automobile while the latter is standing on a plane surface and directed outwardly from the side thereof, on to which the automobile is adapted to be tilted on its side, said rocker supports when in position being located substantially entirely above said plane surface, a tie bar connecting said rocker supports and a brace connected at one end with said tie bar and adapted at its other end to be engaged with part of the automobile, the connection between the brace and tie bar being adjustable longitudinally of the tie bar and also longitudinally of the brace.

10. In apparatus for tilting automobiles, the combination of a pair of spaced rocker supports adapted to be secured at one side of the automobile while the latter is standing on a plane surface and directed outwardly from the side thereof; said rocker supports when in position being located substantially entirely above said plane surface, a tilting bar extending transversely beneath the body of the automobile and adapted at one end to be engaged with the automobile adjacent the rocker supports; and means connected at the other end of the tilting bar adapted to raise the same to tilt the automobile on the rocker supports.

11. In apparatus for tilting automobiles, the combination of a pair of spaced rocker supports adapted to be secured at one side of the automobile while the latter is standing on a plane surface and directed outwardly from the side thereof; a tilting bar extending transversely beneath the body of the automobile and having a hook at one end adapted to be connected with the side of the chassis frame of the automobile adjacent the rocker supports and a bracket adjacent its other end adapted to support the other side of the chassis frame.

12. In apparatus for tilting automobiles, the combination of a pair of spaced rocker supports adapted to be secured at one side of the automobile while the latter is standing on a plane surface and directed outwardly from the side thereof; said rocker supports when in position being located substantially entirely above said plane surface, a tilting bar extending transversely beneath the body of the automobile and adapted at one end to be engaged with the automobile adjacent the rocker supports; and a derrick having its cable connected with the other end of the tilting bar.

13. In apparatus for tilting automobiles, the combination of a pair of spaced rocker supports adapted to be secured at one side of the automobile while the latter is standing on a plane surface and directed outwardly from the side thereof; said rocker supports when in position being located substantially entirely above said plane surface, a tilting bar extending transversely beneath the body of the automobile and adapted at one end to be engaged with the automobile adjacent the rocker supports; a derrick having its cable connected with the other end of the tilting bar; and means connecting the lower end of the derrick with the rocker supports.

14. In apparatus for tilting automobiles, the combination of a pair of spaced rocker supports adapted to be secured at one side of the automobile while the latter is standing on a plane surface and directed outwardly from the side thereof; a tilting bar extending transversely beneath the body of the automobile and adapted at one end to be engaged with the automobile adjacent the rocker supports; and a derrick having its cable connected with the other end of the tilting bar, said derrick being formed as a track up which the end of the tilting bar is adapted to travel.

15. In apparatus for tilting automobiles, the combination of a pair of spaced rocker supports adapted to be secured to one side of an automobile while the latter is standing on a plane surface and directed outwardly from the side thereof, and on to which the automobile is adapted to be tilted on its side, said rocker supports when in position being located substantially entirely above said plane surface, and a supporting brace connected to one of said rocker supports.

16. In apparatus for tilting automobiles, the combination of a pair of spaced rocker supports adapted to be secured to one side of an automobile while the latter is standing on a plane surface and directed outwardly from the side thereof, and on to which the automobile is adapted to be tilted on its side, said rocker supports when in position being located substantially entirely above said plane surface, and a supporting brace adjustably connected to one of said rocker supports.

Signed at Toronto this 8th day of August, 1922.

JAMES OLVER REID.